United States Patent [19]

Nendl et al.

[11] Patent Number: 4,946,696
[45] Date of Patent: Aug. 7, 1990

[54] PROCESS FOR PRODUCING FINE PATTERNATION IN CHOCOLATE SURFACES

[76] Inventors: Joe Nendl; Edith Nendl, both of S. 5013 Dorset Rd., Spokane, Wash. 99204

[21] Appl. No.: 270,365

[22] Filed: Nov. 14, 1988

[51] Int. Cl.⁵ .................. A23G 3/20; A23G 3/28; A23G 7/00
[52] U.S. Cl. .................................. 426/383; 426/87; 426/89; 426/512; 426/660; 101/129
[58] Field of Search ............... 426/104, 87, 89, 93, 426/383, 512, 515, 660; 101/129

[56] References Cited

U.S. PATENT DOCUMENTS

| | | | |
|---|---|---|---|
| 1,781,209 | 11/1930 | Barbera | 101/129 |
| 1,865,097 | 6/1932 | Gilham | 426/249 |
| 3,545,981 | 12/1970 | Klein et al. | 426/249 |
| 4,200,658 | 4/1980 | Katzman et al. | 426/512 |
| 4,369,200 | 1/1983 | Iwao et al. | 426/512 |
| 4,382,968 | 5/1983 | Akutagawa | 426/249 |
| 4,600,692 | 7/1986 | Dobis | 435/108 |

*Primary Examiner*—Donald E. Czaja
*Assistant Examiner*—Helen Pratt
*Attorney, Agent, or Firm*—Keith S. Bergman

[57] ABSTRACT

A process and apparatus are disclosed to form fine patternation and alphanumeric characters of colored cocoa butter in a flush chocolate surface. The apparatus provides a printing sheet defining shallow indentations wherein cocoa butter patternation is deposited by screen printing without disfiguration, and an associated mold plate defining cavities to cast chocolate over the printing sheet indentations. The process comprises the steps of (1) screen printing colored cocoa butter in appropriate pattern on the surface of the printing plate indentations; (2) aging the configured cocoa butter; (3) aligning the mold matrices in adjacency with the printing sheet indentations; (4) filling the mold matrices with thermally plasticized settable chocolate; (5) aging the molded chocolate until set; and (6) removing the molded chocolate structure and embedded patternation for further disposition. The process produces well defined embedded patterns on smaller chocolate structures.

5 Claims, 2 Drawing Sheets

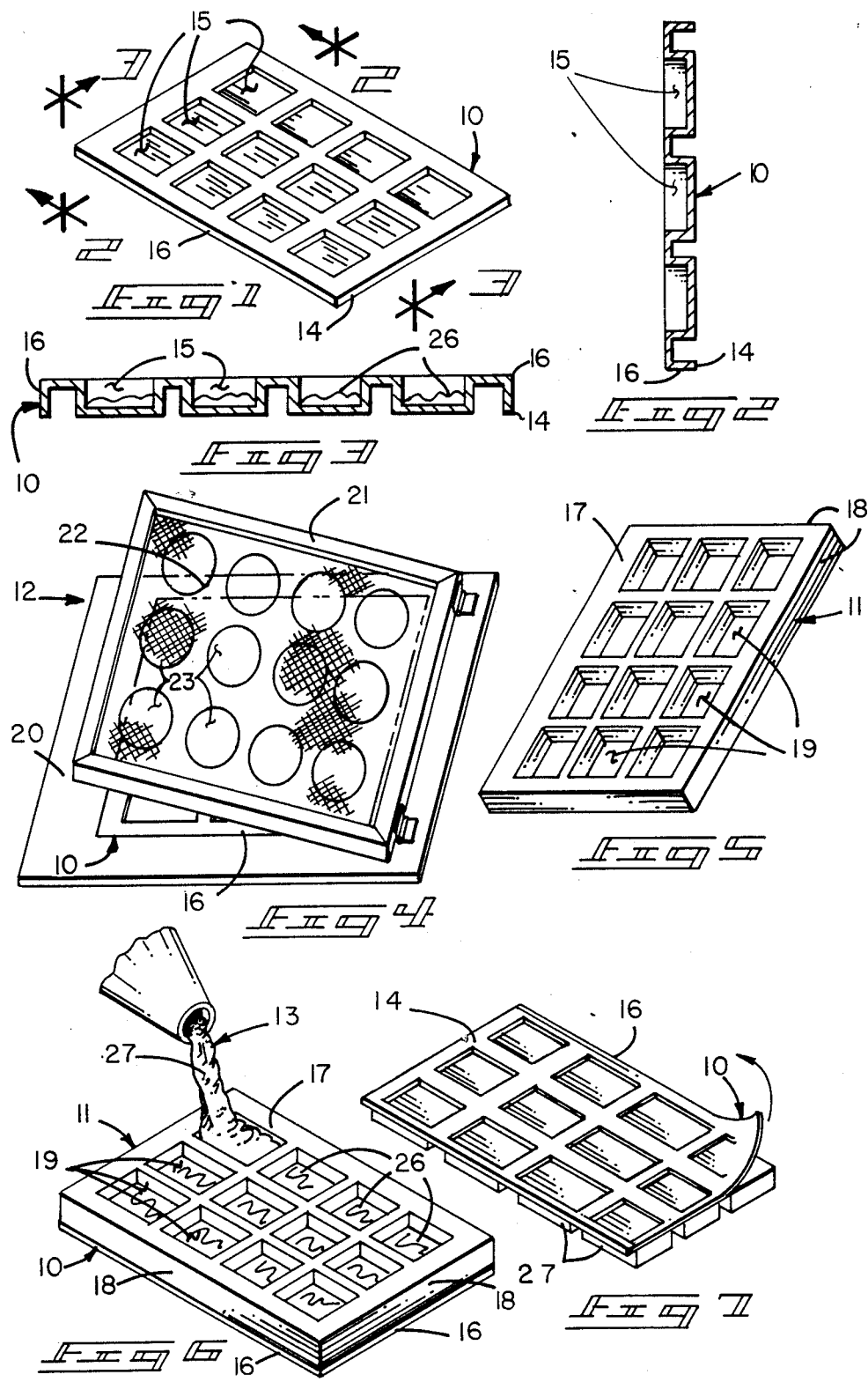

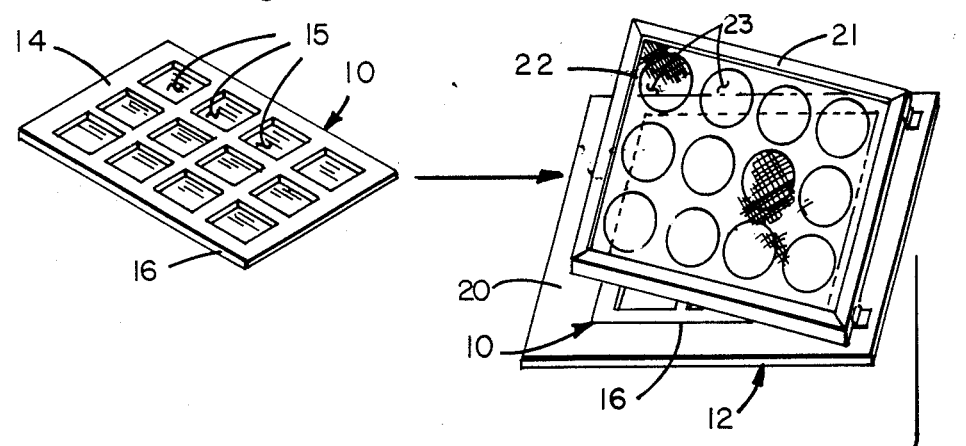
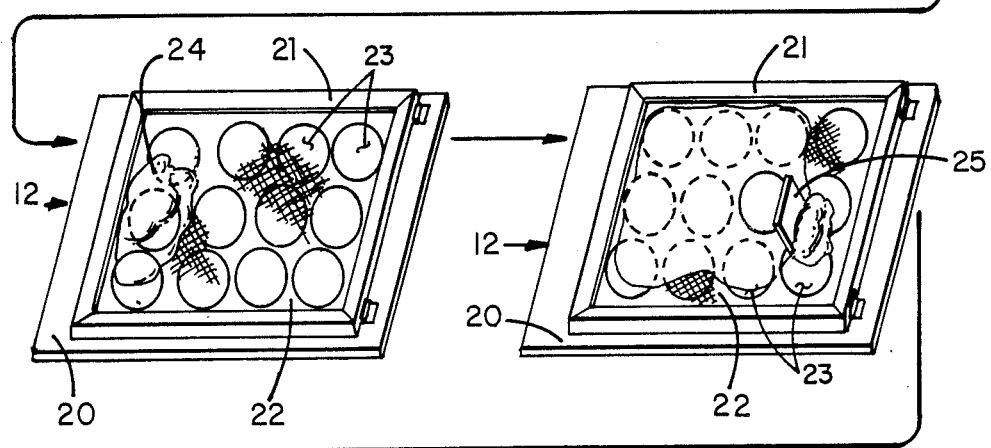
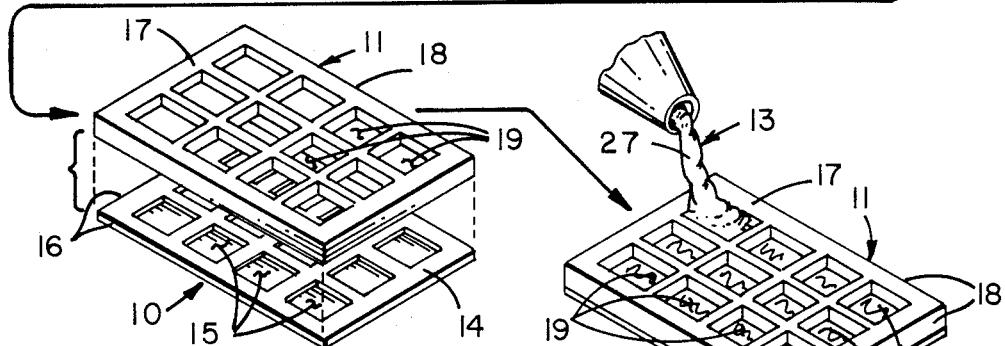
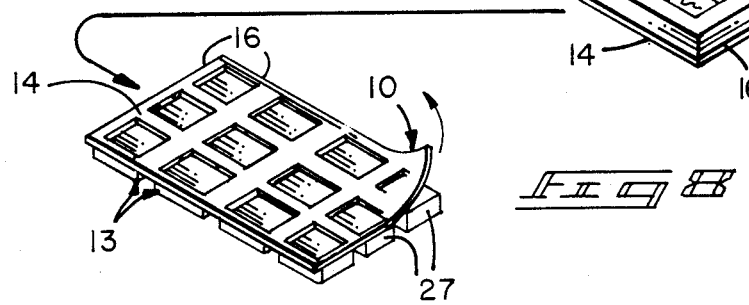
Fig 8

PROCESS FOR PRODUCING FINE PATTERNATION IN CHOCOLATE SURFACES

BACKGROUND OF INVENTION

A. Related Applications

There are no applications related hereto heretofore filed in this or any foreign country.

B. Field of Invention

Our invention relates generally to creation of fine patternation in chocolate surfaces and more particularly to offset printing a colored cocoa butter pattern on a printing sheet and thereafter embedding it in a molded chocolate surface.

C. Background and Description of Prior Art

Semi-solid sweet chocolate has been a desired comestible product, especially in the Northern temperate regions of the world, ever since its commercial availability in the middle 19th Century. Almost from the time of its cultural introduction various aesthetic enhancements of the product have been attempted to increase its human desirability and attendant economic viability. Principal among these enhancements has been the configuration of a chocolate product in one fashion or another to a form that is pleasing to the optical senses to synergistically enhance its overall desirability. Such aesthetic enhancement also has potential added commercial value as it may take the form of advertising without effecting the ultimate edibility of the comestible.

Ontologically the aesthetic configurational development of chocolate products has progressed from early stages of three dimensional shaping of the product in gross, through a medial period of embossed or bas-relief ornamentation embodying alphanumeric characters, ornament, or both, to a fairly sophisticated present day state of finely defined ornament and alphanumeric symbology that is sometimes embedded within the comestible product to produce a smooth continuous peripheral surface. The sophistication and complexity of processes for creating such ornamentation have increased substantially, generally in an accelerating relationship to the increase in aesthetic appealability of the product. The instant invention presents a new and novel process for creating ornamentation of this latter and most recent type.

Though it has long been realized that the finer and more accurately a design may be executed the more aesthetic appeal it has in chocolate confectionary, the production of fine design and alphanumeric symbols have evaded the industry, primarily by reason of the nature of the product itself and the materials and methods used in creating designs in or on it. Semi-solid castable chocolate is a quite complex mixture that is known more by its empirical reactions than by its theoretical nature and because of this, the constituency of the commercially available product varies widely. This situation is exacerbated by the lack of any particular standards or meaningful governmental controls in the field. Additionally to create an optically pleasing design, the design itself must be optically distinguishable from the chocolate matrix surrounding it. This can be readily accomplished with bas-relief design, but in an embedded design if chocolate be used as a design material, it must be modified in some fashion so that it may be optically distinguished from the matrix. This has heretofore been attempted, but the results have not been satisfactory firstly, because it is difficult to modify chocolate material while yet maintaining it as a desirable food product and secondly, the material that is modified has generally been substantially the same as the matrix material so that when the two are associated, the boundaries between them tend not to be sharply defined and oftentimes become irregular and distinguishable only with difficulty, if at all. Settable chocolate also is a difficult material to color or modify in color as its dark, dense, opaque nature does not well accept food dyes or pigments to require use of large amounts of such materials to cause any coloration and to require any light colored or filter type additives to be added in such large quantities as to be practically ineffective.

Our invention solves these problems by using modified cocoa butter as the decorative material. This material is a solid at ordinary room temperatures and viscously plastic at human body temperatures to make it rather ideal for placement and use as a decorative material in chocolate. Cocoa butter is readily colorable by ordinary food dyes and pigments in ordinary amounts, since it physically is a substantially colorless translucent fatty material and it is a product quite as edible as any of the other components of the ultimate confection.

The embodiment of pattern materials in chocolate presents problems in accurately configuring the material in the first instance and in faithfully maintaining that configuration after the material is embedded. Heretofore decorative material has been configured and placed by secondary casting, extrusion and stenciling but these methods have had their limitations because the chemical nature of the material and physical principles involved have prevented fine detailing and formation of a smooth continuous surface on a decorated comestible. In a few instances, an intaglio type of decoration placement has been attempted by creating an indented pattern in the surface of a chocolate matrix, filling the indentations with a secondary visually distinguishable material, and thereafter scraping the surface of the entire product after setting to leave the patternation in place in the chocolate matrix. This is a relatively time consuming and difficult process, generally has not allowed fine patternization of a faithful nature and produces surfaces which are not smooth and planar but generally rather ragged looking.

Our invention solves these problems by configuring the patternation material by screen printing upon a secondary printing sheet surface over which chocolate may later be cast. Since pure cocoa butter does not contain much if any of the particulate matter of chocolate liqueur, it is quite readily adaptable to the screen printing processes and in general may be quite accurately configured by that process, with the limits of accuracy of configuration being determined largely by the ordinary screening parameters and particularly screen mesh size and viscosity of the screened material. The viscosity of cocoa butter can also be better regulated thermally than can chocolate matrix material and its thermal reactions tend to be more consistent, uniform and predictable.

Most importantly, however, we have found that if a pattern of material comprising colored or filled cocoa butter be deposited by screen printing, it tends to set or form crystalline structure that stabilize its configuration after a period of time. The details of this reaction are not definitively known, but the reaction is sufficient to maintain sharp pattern images when the aged pattern material is embedded in an ordinary settable chocolate matrix. This crystalline reaction develops upon aging at room temperature for approximately twenty-four hours after placement. Such an aged pattern will maintain substantially the same fineness as existed at the time of its deposition when embodied in a settable chocolate matrix, while a pattern embodied in chocolate immediately after deposition will tend to intermix and define irregular surface boundaries in a more or less haphazard fashion along its interface with the matrix material. Various colorants or fillers in unaged pattern material will also tend to partially intermix with adjacent chocolate material to form indistinct boundaries.

The process of our invention also provides additional secondary benefits. The cocoa butter patternation material is a translucent fatty substance that readily accepts various food dyes, coloration materials, opacifiers and fillers to maintain a rather translucent colored appearance which with addition of opacifying materials becomes more intensified. In addition, the fatty nature of the cocoa butter, and its critical temperatures, readily avail themselves to known techniques presently used in screen printing. The material plasticizes to a consistency similar to ordinary screen printing inks slightly above room temperatures to make it ideally workable at temperatures easily attainable. Since the patternation material is not per se dependent upon the nature of an embedding chocolate matrix, our process is not limited particularly by the nature of the chocolate matrix material, so variances in that material do not substantially effect our process. Cocoa butter of commerce is a relatively uniform product that normally does not produce variation over very wide ranges in physical or chemical constituency. Our process also requires no specialized materials other than those presently commonly used in the confectionary arts relating to settable sweet chocolate, and it requires no complex or difficult operations or unusual apparatus other than the operations and apparatus presently used in the screen printing and confectionary arts.

Our invention lies not in any one of these features per se, but rather in the synergistic combination of all of them that give rise to the apparatus and process of our invention and the product resulting therefrom as hereinafter more fully specified and claimed.

SUMMARY OF INVENTION

Our invention provides apparatus and a process to create finely defined ornamentation embodied in a surface of a settable chocolate matrix forming a confectionary element. We create a base sheet defining indentations wherein cocoa butter patternation is screen printed to avoid corruption and an associated casting mold to cooperate with the base sheet to co-jointly form molds for casting of thermally plasticized settable chocolate thereover.

To create such an ornamented comestible by our process, we:

(1) create a pattern material comprising a substantial portion of cocoa butter admixed with selected coloring materials, opacifiers, flavoring materials and fillers;

(2) establish the pattern material in predetermined configuration in spacedly arrayed indentations defined in the base sheet by screen printing;

(3) cure the configured pattern material for a period of time until a crystalline structure substantially develops therein;

(4) place a casting mold defining spacedly arrayed cavities on the base sheet to form mold cavities about indentations defined in the base sheet;

(5) pour settable thermally plasticized chocolate in the mold cavities to embody the pattern therein, except at its surface contacting the base sheet;

(6) thermally set the chocolate matrix until it becomes solid;

(7) remove the casting mold from the base sheet and from about the individual cast comestibles; and (8) separate the comestibles and the base sheet for further disposition or processing.

Our process is particularly adaptable to creating shaped chocolate elements, that may be used as such or as caps for filled comestibles, with patternation finely distinguished on the external surface thereof.

In creating such apparatus and process, it is:

A principal object of our invention to provide a process to create a fine, well defined, visible design flush with and embedded in the surface of a settable chocolate comestible.

A further object of our invention to form such design from colored, filled and opacified cocoa butter to provide optical distinguishment from the chocolate matrix thereabout.

A further object of our invention to provide such a process that creates a cocoa butter design in indentations defined in a base sheet by means of screen printing.

A still further object of our invention to provide such a process that uses a multi-cavity casting mold to cover the base sheet to define mold cavities to allow casting of settable chocolate material therein.

A still further object of our invention to provide such a process wherein the cocoa butter design is aged after creation to allow a crystalline reaction to develop that aids in maintaining a fine and well defined boundary between the pattern and surrounding settable chocolate material in a finished comestible.

A still further object of our invention to provide such a process and apparatus therefore that are of new and novel design, of simple and effective nature, of easy and economical operation and otherwise well adapted to the uses and purposes for which they are intended.

Other and further objects of our invention will appear from the following specification and accompanying drawings which form a part hereof. In carrying out the objects of our invention, however, it is to be understood that its essential features are susceptible of change in design and arrangement with only a preferred and practical embodiment being illustrated and specified as is required.

BRIEF DESCRIPTION OF DRAWINGS

In the accompanying drawings which form a part hereof and wherein like numbers of reference refer to similar parts throughout:

FIG. 1 is an isometric view of the base sheet defining indentations for formation of a plurality of separate comestibles.

FIG. 2 is an orthographic traverse vertical cross-sectional view of the base sheet of FIG. 1, taken on the line 2—2 thereon in the direction indicated by the arrows.

FIG. 3 is an orthographic elongate vertical cross-sectional view of the base sheet of FIG. 1, taken on the line 3—3 thereon in the direction indicated by the arrows.

FIG. 4 is an isometric view of an ordinary simple screen printing apparatus, illustrating the indentations defined in the platen thereof to support our base sheet.

FIG. 5 is an isometric view of a casting mold defining plural cavities to be used cooperatively with the base sheet illustrated in FIG. 1.

FIG. 6 is an illustration of the casting mold of FIG. 5 in place on a base sheet and being filled with plasticized settable chocolate.

FIG. 7 is an isometric view of a base sheet being removed from a plurality of comestibles after the comestible material has set.

FIG. 8 is a semi-diagrammatic isometric illustration of the process of forming patterned comestibles pursuant to our invention.

DESCRIPTION OF THE PREFERRED EMBODIMENT

Our invention provides generally base sheet 10 and cooperating casting mold 11 associated so that patternation may be printed on the base sheet by screen printing apparatus 12 and the mold thereafter applied to the base sheet for casting settable chocolate over the patternation to form patterned comestible 13.

Base sheet 10 is formed of flexible material 14 defining a plurality of spacedly arrayed pattern indentations 15. The pattern indentations are sized and configured to define the external periphery of a comestible to be formed by our process and in the instance shown define rectilinear configurations having a depth varying substantially in the range of 0.03 to 0.10 inch. In the illustration of FIGS. 1, 2, and 3, the depth is somewhat exaggerated, both in vertical dimension and in relation to the thickness of sheet material 14, for purposes of better and simpler illustration.

The peripheral dimensions of base sheet 10 are not particularly critical, but for ease of handling with normal sized confections a rectilinear sheet approximately 9×12 inches is usually desirable. Most of the confections produced by our invention are not more than two to three inches in major dimension and oftentimes not more than about three quarters of an inch. With such dimensioning, a substantial number of pattern indentations may be defined in spaced array in a base sheet, as illustrated in FIG. 1. A reasonable space should be left between adjacent indentations to allow positioning of a casting mold and the casting of chocolate. This spacing is not critical and generally one quarter to one-half inch is desirable.

The base sheet itself is formed of a material that will release cocoa butter and settable chocolate materials cast against its surface. This requires a relatively smooth surface and to aid removal of cast confections, it is desirable that the element also be somewhat flexible, though our invention will operate with a rigid base sheet. The material of preference for the base sheet is a food grade polyvinyl sheet plastic of approximately 0.5 to 1.5 mills in thickness. Such material has an added advantage in that it may be configured by vacuum forming methods and in general a thermal plastic is desirable to aid the formation process.

FIG. 2 illustrates a casting mold for use with the base sheet illustrated in FIG. 1. This mold comprises planar body member 17, preferably defining periphery 18 of the same shape and size as that of the base sheet for ease of alignment during use. The planar body defines a plurality of mold cavities 19 extending therethrough. Each mold cavity is of the same size and shape as indentations 15 defined in the base sheet and the spaced array of the cavities is identical to that of the indentations in the base sheet so that the casting matrix may be placed upon the base sheet to cooperatively form a mold structure in conjunction therewith for the molding of chocolate material over the base sheet indentations.

It is convenient in defining the indentations in both the base sheet and cavities in the casting mold that the spaced arrays of those elements by symmetrical to aid in aligning the members by means of their peripheries, though this limitation is not necessary to the functioning of our invention so long as both structures be joinable to define mold cavities as indicated. The casting mold is formed of a food grade plastic material that has smooth surfaces that will release settable chocolate cast thereagainst. Commonly food grade polyvinyl plastics are well adaptable for this structure. The thickness of the plate will determine the ultimate thickness of the comestible to be cast in its cavities and normally will be about 0.06 inch for bonbon caps and about 0.25 inch for bar structures, though the dimension may vary substantially depending upon the results desired in a particular instance.

Screen printing apparatus 12 illustrated in FIG. 4 is of a simplistic type including larger base or platen 20 hingeably supporting peripheral screen frame 21 which in turn carries screen 22 stretched thereover. The screen supports an ordinary stencil 23 and printing is accomplished by moving printing material 24 over the surface of the screen and adhered stencil by means of ordinary squeegee 25. The platen 20 preferably defines plural spaced indentations 20a to supportingly receive indentations 15 defined in the base sheet. These indentations in the platen are not necessary for use with heavier base sheets which tend to be self supporting, but becomes increasingly desirable with thinner more flexible base sheets.

The screen printing process in general is well known and does not constitute a part of our invention, per se, but rather is only a necessary adjunct to it. The screen printing of our cocoa butter designs is accomplished in substantially the traditional fashion of screen printing and the various principles and parameters of that art are generally applicable to our particular use of it. The screen printing apparatus obviously must not contaminate food products. We prefer about a 200 mesh screen for printing the cocoa butter of our invention, though screens with other mesh sizes are operative and function generally as such screens in the past, with the finer mesh size giving finer definition of detail in the printing process so long as the printing media passes effectively through the screen mesh. Most of the screen types commonly used in present day screen printing are usable with our invention, though undoubtedly a screen of stainless steel wire or extruded synthetic fiber is more durable and easier to clean and maintain. The common stencil materials are also usable, though obviously the stencil must be of the water soluble type as the product used in the printing process is a fatty or oily substance that may dislodge or deteriorate an oil soluble screen. Photosensitive or handcut screens of the commonly available commercial types are quite adaptable for use with our process, and generally will reproduce patterns about as fine as may be defined therein.

The components of comestibles 13 formed by our process are commercially available products that generally vary over the ordinary ranges of variance of such products in the present day market.

Cocoa butter is a fat removed in the milling process of cocoa beans by subjecting the ground cotyledon to pressure during its refinement process. The cocoa butter of commerce commonly has a slight somewhat yellowish color, a slight chocolate flavor and aroma, and a melting point of between 33.3 to 34.4 degrees Centigrade. The commercial material in the present day marketplace is often adulterated with other edible fats and oils to change either its physical or chemical properties and with such adulteration, the melting point of the mixture and its viscosity may vary over fairly substantial ranges and may generally be reasonably well predetermined to particular desired values.

Settable chocolate comestible material is a mixture of chocolate liqueur, obtained by ordinary cocoa bean processing, with added sugar, cocoa butter, and sometimes other flavoring or filling agents, especially such as dried milk solids and edible fats. The material always has particulate matter comprising solid portions of the cotyledon of the cocoa beans from which it was formed, but commonly the size of such particles is something under 0.0015 inch and therefore not significant in its effect upon our instant process. Such sweet chocolate material commonly is adulterated with edible vegetable fats that allow variation of viscosity and setting temperature through a fairly broad range. For use with our process, a chocolate matrix material is used that has a setting temperature at about the setting temperature of cocoa butter to be used therewith, as results may be non-uniform and rather haphazard if the chocolate setting temperature be much higher. Commonly, however, most settable sweet chocolate materials of present day commerce do have a solidifying temperature about the same as that of commercial cocoa butter.

With an understanding of the apparatus and materials of our process, the process itself may be understood, particularly with reference to the drawings of FIG. 8.

Firstly, a base sheet and casting mold are created with appropriate dimensioning and configuration of cavities and channels therebetween to form the ultimate ornamented comestible to be produced. In the instance illustrated, a rectilinear comestible of parallelipiped shape will be created and twelve such products will be produced on each base sheet. The casting mold is similarly designed and configured with a thickness substantially the same as that of the ultimate comestible to be produced.

Screen printing apparatus 12 is formed, as indicated, of appropriate materials and a size somewhat greater than the peripheral dimension of the base plate to be printed thereby allow screen printing by ordinary traditional methods. The platen is provided with appropriately configured indentations to receive a particular base sheet. A pattern of desired configuration is created by ordinary methods in stencil 23 and the stencil affixed to the printing screen by adherence in the ordinary traditional manner. The patterns created in the stencil will be substantially identical to the pattern desired to be produced in the ultimate product and each such pattern will be appropriately areally arrayed in the stencil to print in appropriate position in each of the indentations 15 in base sheet 10. The methods of spacially arraying the patterns in the stencil, of placing the stencil in appropriate position on the screen and of properly positioning the base sheets in registration for printing are all accomplished by the principles and methods heretofore known in the screening printing art.

With the apparatus in this condition, base sheet 10 is placed on platen 20 of screen printing apparatus 12 in appropriate registration. Frame 21 and supported screen 20 are then lowered into printing position immediately above the base sheet. Properly colored and modified cocoa butter 26 is placed on the screen and moved across its surface by squeegee 25 to cause that cocoa butter to extrude through the screen orifices in the various areas not covered by stencil 23 in the traditional fashion.

Prior to printing of cocoa butter patterns, the cocoa butter is admixed with appropriate colorant materials, fillers and modifier, as desired. If the cocoa butter is colored with food colors, the resultant material is normally semi-translucent, as both the cocoa butter itself is of this nature and so also is the colorant. For an opaque patternation, ordinary food grade opacifiers, as heretofore commonly used in the confectionary arts, may be added to the cocoa butter. Such opacifiers generally are particulate materials of sorts, but in general they are ground finely enough that they do not interfere with the screen printing process itself and in fact, may even add body and viscosity to the cocoa butter at printing temperatures to improve its printing characteristics. Commonly, opacifiers will merely perform the opacifying function and generally will not require any more colorant, if as much, than non-opacified material. Various fillers and extenders, as heretofore known in the chocolate processing arts, and particularly various edible vegetable fats, greases and waxes, may be admixed to the cocoa butter to provide their particular properties or characteristics to modify especially viscosity and melting point, though in general such additives are not necessary for ordinary use with our invention.

The parameters of this screen printing are somewhat critical to our process. The cocoa butter during the printing operation should be of a viscous plastic nature approximating the consistency of ordinary screen printing inks for hand use. Normally this will require a temperature at or very slightly above the melting point of the particular cocoa butter in question, as the viscosity of the material varies somewhat as an inverse function of its temperature. Normally the temperature of the cocoa butter will be regulated by heating and thermally tempering in ordinary apparatus prior to placement on the printing screen. After it is once placed on the screen, the temperature may conveniently be regulated by heat lamps at a distance of two to three feet from the screen surface as normally the required temperatures will be slightly above that of the ambient atmosphere. Normally it is not necessary to carry out our process in any sort of a totally thermally controlled environment, as in special temperature controlled rooms or the like.

In the printing process, it is to be noted that the undersurface of the printing screen will generally rest upon the upper surface of base sheet 10 and therefore slightly above the upper surface of the bottom of each indentation defined in the base sheet. This arrangement allows some definitive space for disposition of the printed cocoa butter so that it will maintain its printed configuration and not smear or its pattern be otherwise corrupted. This is somewhat different than an ordinary screen printing process where the ink or printing material is absorbed, at least partially, into a flat surface upon which the printing is accomplished, as in the case of our process the cocoa butter is not absorbed at all in the supportative surface. The vertical dimension of the indentations defined in the base sheet may be regulated for particular parameters and conditions, but in general with ordinary cocoa butter printed at a temperature at or immediately below its melting point, a cavity varying in depth between 0.015 to 0.03 inch appears to be most appropriate. The fineness of lines and pattern configuration may be more or less regulated by the depth of these indentations. Both indentation depth and the amount of cocoa butter passed through the screen must be regulated so that the printed pattern, and especially its lower surface, is not pressured to form a pattern more broad than that defined in the screen through which it was printed.

After the base sheets are printed, they are aged under ordinary atmospheric conditions and at room temperatures of about 68 to 72 degrees Fahrenheit for a period of approximately twenty-four hours. Apparently during such aging, the configured cocoa butter forms a somewhat crystalline colloid that is more configurationally stable than the unaged product, though the exact nature of this process is not known. This aging step is necessary to our process to form fine and faithful patterns as if a cocoa butter pattern be embodied in chocolate immediately after its formation, some patterned configuration will be retained, but the resultant pattern in the exposed surface of a comestible, is rough and irregular and not so finely distinguishable as the stencil pattern through which the deposit was originally formed. Most probably the ultimate process involved forms a crystalline colloidal of one sort or another, though it well may be enhanced by some sort of oxidative reaction or evaporative reaction of some of the more volatile components of the cocoa butter mixture. The aging is preferably carried out at approximately room temperature, but in any event, at a temperature below the melting point of the particular cocoa butter involved. The effectiveness of the aging process seems to vary substantially inversely with the ambient temperature at which it is carried out.

After the printed patterns on a base sheet have aged appropriately, the base sheet is set on a flat supporting surface and casting mold 11 placed thereover in such fashion that orifices 19 defined in that mold coincide with indentations 15 defined in the base sheet. It is to be noted in this regard that with base sheet and casting mold formed as specified, this positioning will automatically be accomplished by aligning the peripheries of the two elements, and this may be more readily accomplished by use of a peripheral box or "L" shaped support about a corner of the two cooperating membranes (not shown). With the two members in alignment, thermally plasticized and tempered settable chocolate material 27 is poured into each mold cavity to fill that cavity to its top and preferably slightly therebeyond. The top of the casting mold may then be scraped with a long blade, such as a spatula, in the traditional fashion heretofore known in the confectionary arts to level and smooth the tops of the cast chocolate material.

After casting, the chocolate material is allowed to set, which at ordinary ambient temperatures (65 to 72 degrees Fahrenheit) will usually require only a few minutes, generally three to five minutes with ordinary sized articles. After the chocolate is set and sufficiently solid, the casting mold is removed by manual manipulation to leave the cast confections adhering to some degree to the base sheet. The casting mold should not be allowed to remain in place for too long a period after the chocolate molded therein has set, as that chocolate may tend to adhere to the surfaces defining mold cavities and become difficult to remove therefrom. The cast chocolate may, however, remain in place on the base sheet for indefinite periods without causing any harm. In fact, the product is easier to remove after an appropriate aging period of about twenty-four hours, as the material tends to better and more firmly set with more coherence upon such aging, as previously discussed. Leaving the product on the base sheet is a practical and efficient method of product maintenance for storage or transport. To ultimately remove the molded product, the base sheet or product are manually moved, as illustrated in FIG. 7, to break away bond between the faces of the comestibles and the adjacent base sheet. The comestibles, then completely formed and singulated, are removed for further disposition and processing.

It is to be noted that settable chocolate material 27 must be sufficiently plastically fluidic at temperatures near the melting point of the cocoa butter material from which patternation is formed or else that patternation material may be configurationally corrupted during the embodying process described and most probably would lose its desired configuration, or at least it may lose clear and fine definition of that configuration.

It is further to be noted that our process operates with most settable chocolate materials of present day commerce and will allow the use of various modifiers such as edible oils, fats and waxes that commonly are used in such products to modify their physical characteristics and especially setting temperatures, viscosity and surface appearance.

The foregoing description of our invention is necessarily of a detailed nature so that specific embodiments of it might be set forth as required, but it is to be understood that various modifications of detail, rearrangement and multiplication of parts and reorientation of elements and components may be resorted to without departing from its spirit, essence or scope.

Having thusly described our invention, what we desire to protect by Letters Patent and, what we claim is:

1. A process for the formation of a comestible having cocoa butter patternation embedded in one surface of a settable chocolate matrix, comprising the steps of:
   forming a base sheet defining at least one pattern indentation;
   depositing thermally plasticized cocoa butter in patterned configurations in the indentations defined in the base sheet by screen printing with a screen at a spaced distance above the adjacent indented surface of the base sheet;
   curing the patterned configurations of cocoa butter for a period of approximately twenty-four hours;
   forming plasticized settable chocolate over the cocoa butter patternation to embody the exposed surfaces of the cocoa butter patternation;
   setting the plasticized chocolate; and
   removing the chocolate and embodied cocoa butter patternation from the base sheet.

2. The invention of claim 1 further limited by:
   the cocoa butter having additives chosen from the group consisting of edible coloring dyes, fillers, opacifiers, and flavoring agents.

3. The invention of claim 1 further limited by:
   the base sheet being formed of flexible sheet material and defining a plurality of spacedly arrayed pattern indentations each having a depth of between 0.015 and 0.03 inch and a peripheral configuration substantially the same as that of the embodying chocolate to be formed thereover.

4. The invention of claim 1 further limited by:
   the plasticized settable chocolate being formed over the pattern indentations in a mold plate defining plural spaced mold cavities arrayed to be coincident with the pattern indentations defined in the base sheet when the mold plate be positioned over the base sheet in at least partial peripheral coincidence therewith to form a plurality of spacedly arrayed, open top mold cavities to receive and contain plasticized settable chocolate.

5. A process for formation of a settable chocolate comestible having cocoa butter patternation embedded in at least one surface thereover, comprising the steps of:

forming a flexible base sheet with a plurality of spacedly arrayed pattern indentations, each having a depth of between 0.015 and 0.03 inch and a peripheral configuration substantially the same as that of an embodying chocolate comestible to be formed thereover;

depositing a thermally plasticized mixture of cocoa butter, having additives from the group consisting of edible coloring dyes, fillers, opacifiers, and flavoring agents, in patterned configuration by means of screen printing through a screen spacedly above the upper surface of the indentations defined in the base sheet;

curing the patterned configurations of cocoa butter on the base sheet at temperatures substantially between 68 to 72 degrees Fahrenheit for approximately twenty-four hours;

placing a mold plate defining plural mold cavity sized, configured and spacedly arrayed to be coincident with the pattern indentations defined in the base sheet on the base sheet so that the cavities and indentations are in registration to define open top mold cavities;

filling the mold cavities so formed with thermally plasticized settable chocolate;

allowing the chocolate to set to a solid state; and removing the mold plate from the chocolate comestible and separating the chocolate comestible from the base sheet.

* * * * *